(12) United States Patent
Bertocchi

(10) Patent No.: US 8,367,132 B2
(45) Date of Patent: Feb. 5, 2013

(54) EXTRACTION METHOD AND APPARATUS OF JUICE AND/OR PUREE, IN PARTICULAR FROM PARTIALLY OR COMPLETELY FROZEN VEGETABLES

(76) Inventor: Alessandro Bertocchi, Parma (IT)

( * ) Notice: Subject to any disclaimer, the term of this patent is extended or adjusted under 35 U.S.C. 154(b) by 109 days.

(21) Appl. No.: 12/740,761

(22) PCT Filed: Nov. 17, 2008

(86) PCT No.: PCT/IB2008/003102
§ 371 (c)(1), (2), (4) Date: May 10, 2010

(87) PCT Pub. No.: WO2009/063309
PCT Pub. Date: May 22, 2009

(65) Prior Publication Data
US 2010/0247728 A1    Sep. 30, 2010

(30) Foreign Application Priority Data
Nov. 16, 2007 (IT) .................................. PI2007A0127

(51) Int. Cl.
*A23L 2/04* (2006.01)
(52) U.S. Cl. ........ 426/238; 426/599; 426/489; 426/518; 426/520; 426/524
(58) Field of Classification Search .................. 426/244, 426/518, 520, 524, 425, 489, 238, 599
See application file for complete search history.

(56) References Cited

U.S. PATENT DOCUMENTS

| | | | | |
|---|---|---|---|---|
| 1,840,798 A | * | 1/1932 | Tressler | 426/429 |
| 1,940,353 A | * | 12/1933 | Jenkins | 426/518 |
| 2,478,893 A | * | 8/1949 | Brant | 241/65 |
| 2,503,695 A | * | 4/1950 | Webb et al. | 426/384 |
| 2,765,234 A | * | 10/1956 | Schmitt et al. | 426/414 |
| 2,863,776 A | * | 12/1958 | Lisher | 426/599 |
| 2,888,353 A | * | 5/1959 | Toulmin, Jr. | 426/478 |
| 3,860,734 A | * | 1/1975 | Huth et al. | 426/650 |

(Continued)

FOREIGN PATENT DOCUMENTS
DE    4431394    2/1996
WO    2005/036993    4/2005

*Primary Examiner* — Drew E Becker
(74) *Attorney, Agent, or Firm* — Ladas & Parry LLP

(57) ABSTRACT

A rotating machine operated along an axis (3a) by a motor (3), for extraction of puree or juice from animal or vegetable food, comprises an inlet duct (1) where the animal or vegetable food (2) is loaded, for example fruit or vegetables, conveyed by a feeding screw conveyor not shown. The food pulps of the products (2) are loaded in frozen condition and enter then a shredding section comprising an armature (4) rotatable at a high speed in a stator (5) where the product is subjected to pressure pulses in quick succession by the movement of the frozen product (2) between the armature (4) and the stator (5). This way, there is a significant transformation of the mechanical energy into thermal energy that assists partial defrosting (at least 10%) of the product, obtaining a desired, temperature course of the product at least up to the end of the extraction with respect to the defrosting temperature (T*) of the product, which can be 0OC or even less. A fluid material is obtained that has the consistency of a puree even if it contains still small frozen parts. On the external wall of the stator (5) thermal power can be applied contemporaneously to the pressure pulses, in order to heat the inner surface of the stator (5) or the rotor (4), by applying vapor or by means of electric resistance.

11 Claims, 6 Drawing Sheets

U.S. PATENT DOCUMENTS

| | | | |
|---|---|---|---|
| 4,643,085 A | | 2/1987 | Bertocchi |
| 4,906,486 A | * | 3/1990 | Young .......................... 426/518 |
| 5,252,347 A | * | 10/1993 | Darbonne .................... 426/393 |
| 5,283,078 A | | 2/1994 | Bertocchi |
| 5,362,509 A | * | 11/1994 | Martens ....................... 426/524 |
| 5,747,088 A | * | 5/1998 | Fletcher ...................... 426/425 |
| 5,849,350 A | | 12/1998 | Ashourian |
| 6,190,718 B1 | * | 2/2001 | Eek et al. .................... 426/524 |
| 2004/0265451 A1 | * | 12/2004 | Rooks et al. ................. 426/489 |
| 2006/0040028 A1 | * | 2/2006 | Larson ......................... 426/518 |
| 2012/0076913 A1 | * | 3/2012 | Murdza ........................ 426/599 |

* cited by examiner

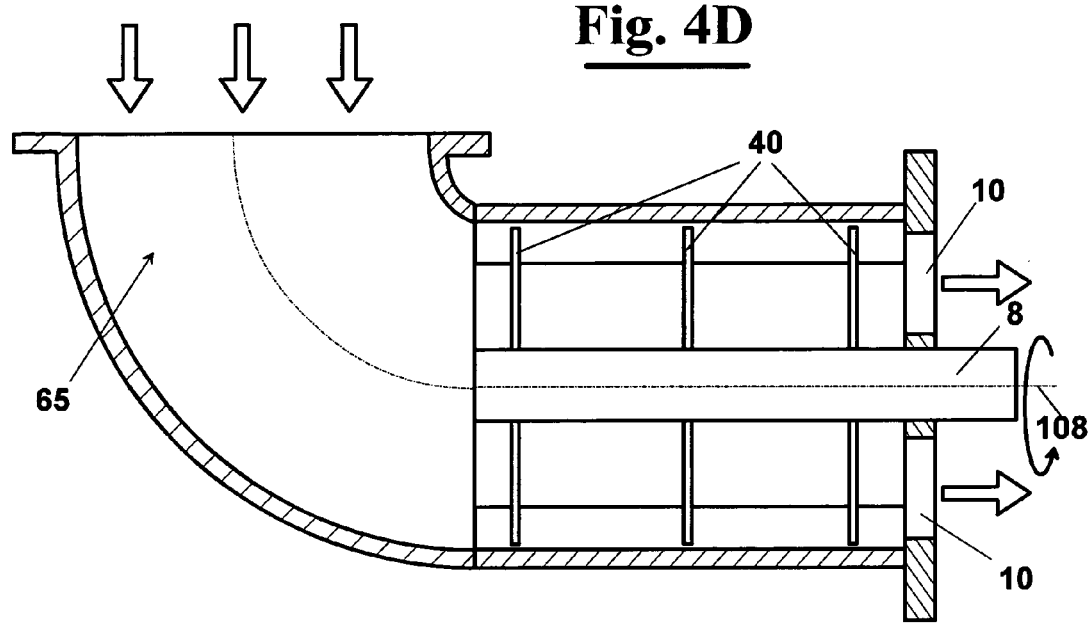
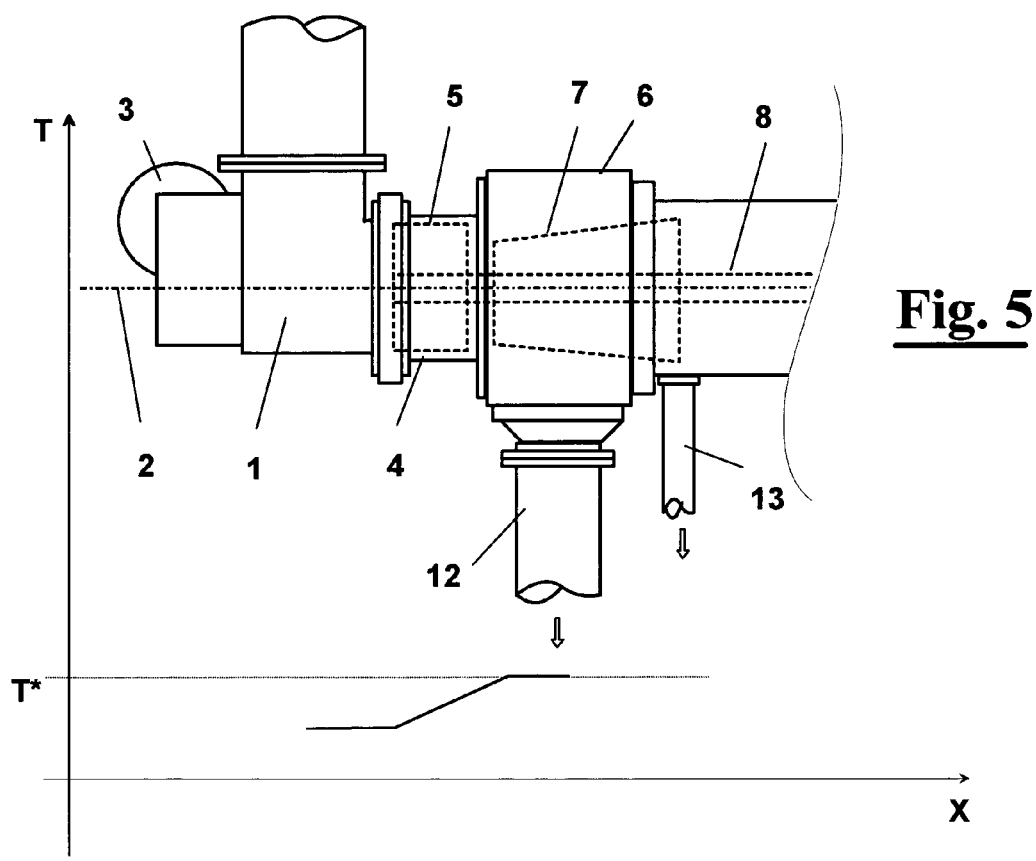

EXTRACTION METHOD AND APPARATUS OF JUICE AND/OR PUREE, IN PARTICULAR FROM PARTIALLY OR COMPLETELY FROZEN VEGETABLES

FIELD OF THE INVENTION

The present invention relates to the food industry and, in particular, it relates to the extraction of juice and puree from vegetable or animal food.

In particular, the invention relates to a process for optimizing the efficiency of extraction of puree or juice from said food.

Furthermore, the invention relates to a machine that carries out this process.

DESCRIPTION OF THE PRIOR ART

As well known, a variety exists of types of rotating machines, in particular milling and finishing machines, for extracting juice and puree mainly from vegetable food, fruit and vegetables, but also from animal food, meat and fish.

Normally, the product to treat is previously softened or chopped more or less finely in a first step, for being then put in an extraction machine in a second step. The extraction machines of the prior art are essentially made up of a fixed structure that comprises an apertured sheet of cylindrical or conical shape, so-called sieve, and by an armature with blades that rotates inside. The armature is mounted on a shaft and caused to rotate by a motor. In particular, the chopped or softened product is continuously pushed radially by centrifugal force against the sieve. This way it is filtered through the holes of the sieve, producing a puree and a liquid part of the product that is conveyed for being then subject to further treatments. The solid part that cannot pass through the sieve, instead, is conveyed axially opposite to the inlet of the sieve and is automatically brought to an unloading station as a waste material. See on this argument IT1199392.

A known process of this kind, for example, is the so-called extraction at room temperature, which is carried out in two steps: a first softening step the food pulps through a plurality of pulses in quick succession and a second separation step of the useful part (puree or juice) from the waste solid parts, which is carried out in an extracting machine as above described.

During the softening step the pulses in quick succession are obtained by a cylindrical or conical body; or stator, which has protrusions on its inner surface, and by an armature—having blades—that rotates in the stator pushing by centrifugal force the food pulps against the protrusions, determining the pulses that cause the softening. See on this subject matter IT1249363.

In the extraction process at room temperature, according to the state of the art above described, the steps of softening and extracting are carried out in a single compact working unit that has a single motor: the respective softening and extracting armatures are mounted on the same axis and rotate then at the same speed. See hereinafter FIG. 1 and the relative description. Alternatively, according to PI2003A000081, there are two different drives, respectively for the softening step and for the extracting step, in order to treat more or less sensitive products, which are affected by the softening step in a different way, and for calibrating better the separation between puree and solid parts.

The vegetables from which the puree can be obtained may be fresh or frozen. Even if treating frozen products is much more expensive, because they stay more time in the production cycle than fresh products, using frozen products can be advantageous for keeping the vegetables with time, for covering long distances of transportation and for keeping at most the organoleptic qualities of the vegetables that would be quickly reduced after harvesting.

Presently, in order to extract puree and/or juice from a vegetable product loaded at a temperature lower than zero degrees or in any case completely or partially frozen many different processes can be used.

The product is normally kept at different temperature under zero in various forms and size, such as blocks, barrels, or IQF (Individually Quick Frozen). In the first cases, they are vegetables previously frozen in parallelepiped shape, or also cylindrical shape with the size of a standard barrel of 200 kg. In the IQF case the vegetable product is frozen singularly or in small parts previously cut into small cubes (size about 5-20 mm×5-20 mm) and kept as individual parts.

Being generically products that are kept frozen for many months and then put on the market, it is necessary to maintain the taste and the qualitative features as much as possible unchanged, for not to spoil products with a higher value than the fresh products.

When exiting from a cold store (temp. from −40° C. to 0° C.) the frozen products have a hardness assimilated to that of the ice and cannot be treated with the devices for making puree from fresh vegetables or already completely defrosted vegetables. Therefore, the product must first be completely defrosted.

Normally, the mostly used defrosting systems are those that use vapour as heat exchange fluid, even if plants are known that use the electric energy directly by means of resistances or indirectly by microwave systems or other devices that exploit electric or magnetic fields. They provide normally a conveyor belt for the product, which is of IQF type or is previously cut and then chopped into remarkably smaller pieces (50-200 mm), up to a screw conveyor where a direct or indirect injection of the vapour is carried out. In the screw conveyor the product moves slowly and is subject to gradual continuous heating up to a complete defrosting. A possible softening step to assist the extraction can be carried out.

One of the major problems that is met is that a completely defrosted product, in particular of vegetable nature, deteriorates quickly and easily after defrosting. In fact, after only a few minutes from defrosting, enzymatic phenomena occur such as oxidation, that cause a change of the colour, of the consistency and of the taste.

The producers of puree from frozen products, even if aiming always at a maximum quality, before extracting the puree must cope with slowness of defrosting, which can last from 1-2 min. to 30-40 min according to the type of process. This slowness of defrosting is due to the fact that plants with higher power, for defrosting quickly (several seconds) a product in an industrial amount, for example from 500 kg to different tenths of tons per hour, do not justify the cost for the construction and for the production. There are also technological difficulties, as in case of the vapour, in order to provide the exchange between a surface that is heated by the vapour, or the vapour same, and the product.

A further not negligible problem is that the defrosted product, notwithstanding the slowness of the defrosting process, requires in any case a high energy consumption, and this increases further the costs for this type of product with respect to a fresh product.

Then, the extraction at room temperature described in the documents above cited, which in case of the fresh product achieves excellent results, in case of frozen product not only is more expensive but also it does not give satisfactory results, since the defrosted product, even before starting the extraction of the puree, has already lost a large part of the valuable qualitative features that it had before.

Concerning the fresh product, which then has not been subject to freezing, but that in any case is kept cold, for example from 2° C. to 5° C., before being treated for extracting the puree, there are cases in which a cold extraction is not possible, according to the type of vegetable. Even in this case, there is the problem that an unavoidable heating at a higher temperature, up to bringing it at room temperature, has to be made as late as possible before the extraction, for delaying at most the enzymatic phenomena.

SUMMARY OF THE INVENTION

It is therefore a feature of the present invention to provide a process that is adapted to optimize the efficiency of extraction of puree or juice from food pulps of food frozen product.

It is, in particular feature of the present invention to provide a process that avoids or reduces to the minimum the drawback due to a slow heating process and carries out very quickly the extraction of the puree through an extractor, avoiding significant quality losses during the defrosting, carrying and extracting steps.

It is another feature of the present invention to provide a process that allows, starting from a frozen product, to supply to an extractor for extracting puree in a short time that is similar to that necessary for feeding an extractor with fresh product.

It is another feature of the present invention to provide a process that allows, starting from a frozen product, of extraction of puree or juice with a energy consumption less than the existing methods.

It is another feature of the present invention to provide a process that allows, starting from cold fresh product, an extraction of puree or juice as late as possible, for delaying at most the enzymatic phenomena.

The present invention wishes also to provide a machine that carries out this process reaching the same objects.

In a first aspect of the invention, the above described and other objects are accomplished by the process for extracting puree or juice from food pulps of food frozen products comprising the steps of:
  feeding said food frozen products to a softening section of the pulps,
  in said softening section application to said food frozen products of a mechanical action up to obtaining a frozen product that is finely chopped with size less than 6 mm and a defrosting rate of at least 10%;
  feeding said finely chopped frozen product to an extractor to prepare said puree or juice by passing through a sieve.

Advantageously, the mechanical action can be selected from the group comprised of:
  pressure pulses applied to said food frozen products;
  a cutting action made by means of cutting elements that cut said food frozen products;
  an action of extrusion of said food frozen products pushed with force through a perforated matrix;

Preferably, said puree or juice comprise a liquid phase where still frozen solid particles are dispersed that are caused to pass through the sieve of the extractor.

In particular, the mechanical action is associated with an action of friction of said product in a stator by an armature that rotates at a high speed in said stator, preferably at a speed set between 500 and 3000 rpm.

In particular, said pressure pulses and said friction cause a transformation of mechanical energy into thermal energy for an amount set between 0.5 Kw/ton up to 3 Kw/ton of product, preferably between 1 kW and 1.5 Kw/ton.

Advantageously, in said softening section thermal power is applied contemporaneously to said pressure pulses.

In a preferred implementation of the method, said pressure pulses are applied by moving said frozen product between said armature and stator with inner surfaces that are facing each other and have protrusions and recesses, said thermal power being supplied by heating at least one among said inner facing surfaces.

In a first preferred exemplary embodiment, said thermal power is supplied by heating said stator, by means of circulation of vapour out of said stator. In particular, the vapour flows in said stator without contact with the frozen product. Alternatively, the vapour flows in said stator and is at the same time injected between said two facing surfaces.

In a second preferred exemplary embodiment, said thermal power is supplied by heating the surface of said stator to contact with the product by means of electric resistance in said stator.

Advantageously, for increasing the friction and the cutting features of the armature and/or stator, their inner surfaces can provide a plurality of cutting blades. This way, the cutting blades on the static part and on the dynamic part offer higher resistance against the movement of the product, then dissipating more energy by friction.

In another aspect of the invention, the above described and other objects are accomplished by a machine for extracting puree or juice from food pulps of food frozen products comprising:
  means for feeding said food frozen products to a softening section of the pulps,
  means for applying to said food frozen products a mechanical action up to obtaining a frozen product that is finely chopped with size less than 6 mm and a defrosting rate of at least 10%;
  means for feeding said finely chopped frozen product to an extractor to prepare said puree or juice by passing through a sieve.

In particular, said means for applying to said food frozen products a mechanical action are selected from the group comprised of:
  means for applying to said food frozen products pressure pulses;
  means for applying to said food frozen products a cutting action by means of cutting elements;
  means for applying to said food frozen products an action of extrusion.

Advantageously, said means for applying to said food frozen products pressure pulses comprises a stator and an armature that rotates at a high speed in said stator.

In particular, the inner surfaces of said stator and/or armature provide a plurality of cutting blades for increasing the friction and the cutting features and then offer higher resistance against the movement of the product dissipating then more energy by friction.

In a preferred exemplary embodiment, a means is provided for applying a predetermined thermal power to said stator.

In a first exemplary embodiment, said means for applying a predetermined thermal power to said stator comprises a jacket of circulation of vapour out of said stator.

In a second exemplary embodiment said means for applying a predetermined thermal power to said stator comprises an electric resistance in said stator.

In a further exemplary embodiment said means for applying a predetermined thermal power to said stator comprises an electric resistance in said armature.

In a further aspect of the invention, the above described and other objects are accomplished in a machine for extracting puree or juice from food pulps of food products comprising:

means for feeding said food products to a softening section of the pulps, means for applying to said food products pressure pulses up to achieving a product that is finely chopped with size less than 6 mm;

means for feeding said product that is finely chopped to an extractor to prepare said puree or juice by passing through a sieve, wherein said means for applying to said food frozen products pressure pulses comprises a stator and an armature that rotates at a high speed in said stator, and wherein a means is provided for applying a predetermined thermal power to said stator and/or to said armature.

BRIEF DESCRIPTION OF THE DRAWINGS

The invention will be now shown with the following description of an exemplary embodiment thereof, exemplifying but not limitative, with reference to the attached drawings wherein:

FIGS. 4C and 4D show a longitudinal cross section of two possible exemplary embodiments of the softening section of FIG. 4A;

FIG. 5 shows the rise of temperature of the product in the softening section up to exiting from the extractor, according to the process for the invention using the rotating machine of FIG. 1;

DESCRIPTION OF THE PREFERRED EXEMPLARY EMBODIMENT

Figure 1:
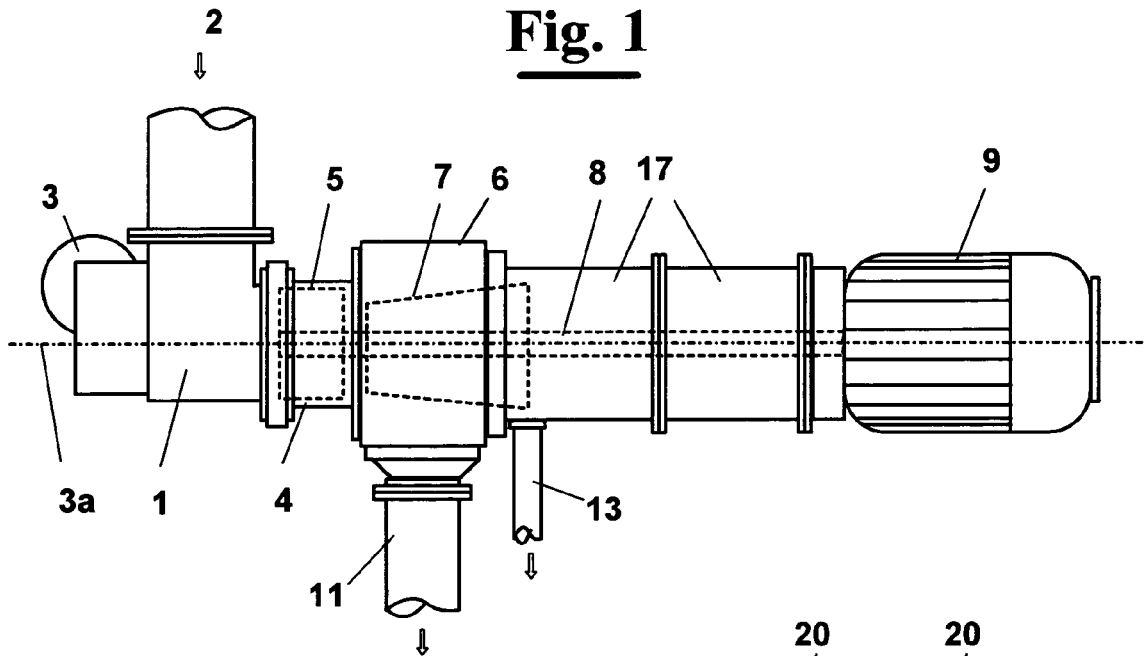
FIG. 1 shows a longitudinal cross section of a rotating machine for extracting puree or juice from animal or vegetable food in a first configuration.

With reference to FIG. 1, a rotating machine of the prior art operated along an axis $3a$ by a motor 3, for extraction at room temperature of puree or juice from animal or vegetable food, comprises an inlet duct 1 where the animal or vegetable food 2 is loaded, for example fruit or vegetables, conveyed by a not shown feeding screw conveyor.

According to the present invention, the food pulps of the products 2 are loaded in frozen condition, directly as IQF or, in case of frozen products in barrels, in previously triturated smaller parts for example with size set between 50-200 mm.

The frozen products enter then a softening section where they are subject to a mechanical action up to obtaining a frozen product that is finely chopped, in particular with size less than 6 mm and a defrosting rate of at least 10%.

The softening section can, for example, comprise an armature 4 rotatable at a high speed in a stator 5. In this section the product is subjected to pressure pulses in quick succession by the movement of frozen product 2 between armature 4 and stator 5, which have (see FIGS. 3, 4A and 4B) inner surfaces that are facing each other and have protrusions and recesses, respectively $4a$ and $4b$ for the armature and $5a$ and $5b$ for the stator.

Figure 3:
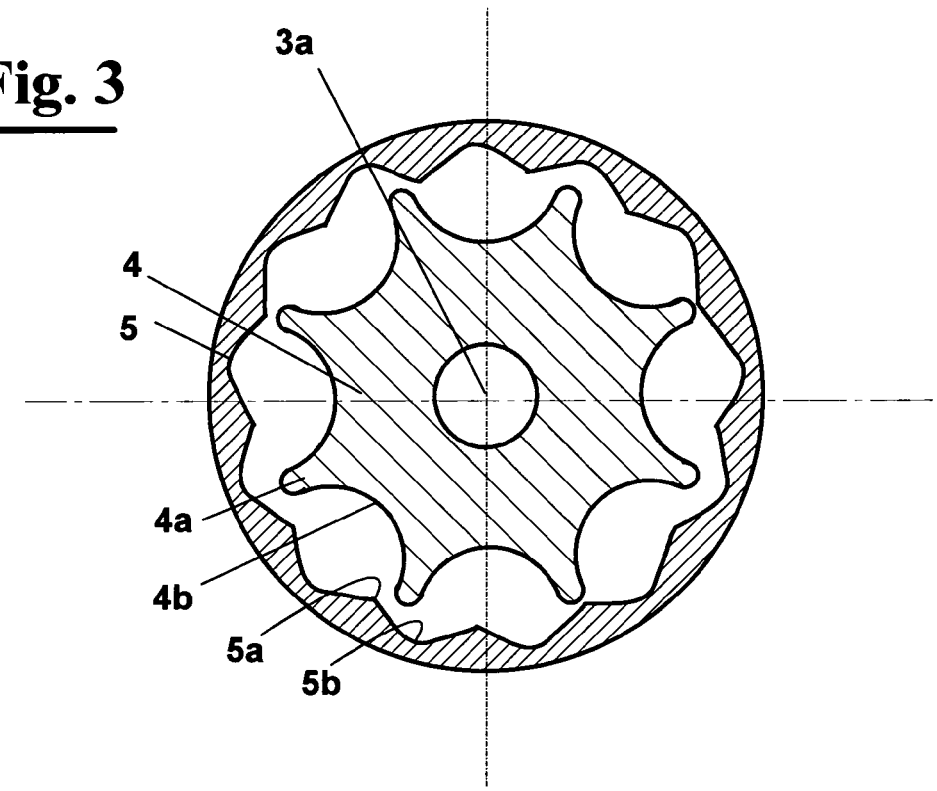
FIG. 3 shows a cross sectional view of the softening section of the rotating machines of FIG. 1 or 2 in a first exemplary embodiment.
Figure 4A:
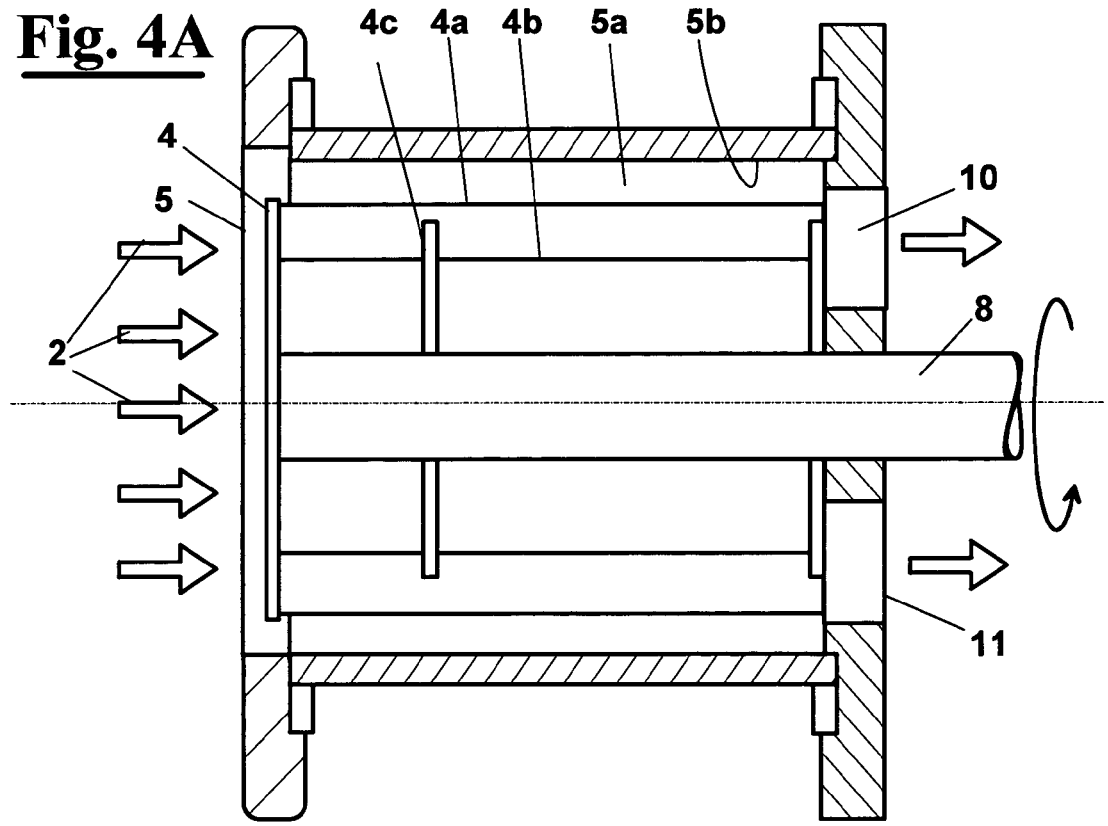
FIGS. 4A and 4B show respectively in a longitudinal cross section the softening section of the rotating machines of FIGS. 1 and 2 in said first exemplary embodiment.
Figure 4B:
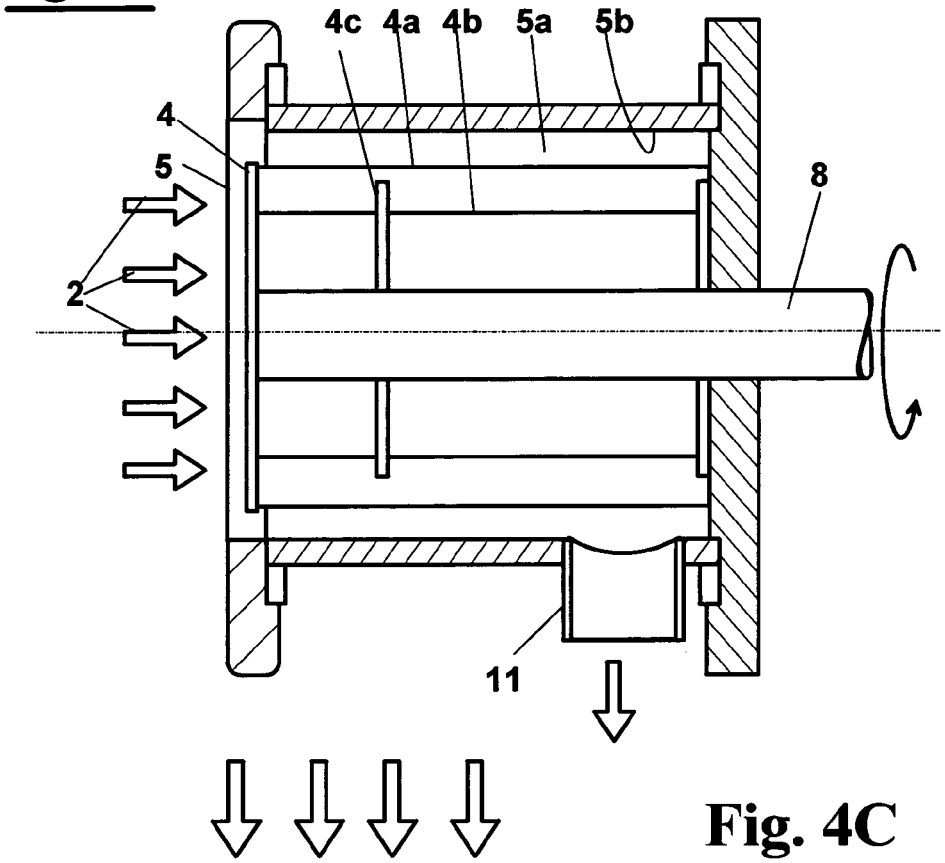

The solution of FIGS. 3, 4A and 4B for the frozen products, even if similar to that used in IT1249363 for the fresh or defrosted product, has a substantial difference in the fact that the product 2 enters when it still is frozen. This causes a different transformation process, since the armature, owing to the rotation and to the conformation with protrusions and recesses, which is associated to the corresponding shape of the stator, applies to the frozen food pulps not only by a plurality of pulses in quick succession but also by a strong friction. In particular, for increasing the friction and the cutting features of the armature and/or stator, their inner surfaces provide a plurality of cutting blades (not shown). This way, more energy by friction is dissipated, i.e. there is a significant transformation of the mechanical energy into thermal energy that assists partial defrosting (at least 10%) of the product. This implies that the friction caused by the stator and by the armature provides to the product at least 10% of the latent heat of fusion.

The friction of the product between the stator and the armature increases as the speed of armature 4 in stator 5 increases, preferably at a speed set between 500 and 3000 rpm. While for a fresh or defrosted product the transformation of mechanical energy into thermal energy is not desired, because it would create a not desired heating of the product, in case of frozen product it is desired.

For example, if $1/5$ of the electric power installed P supplied to armature 4 is unavoidably dissipated in the electric motor by mechanical external friction to the device, about $4/5$ of the electric power supplied to armature 4 is dissipated, according to the invention, in the machine, and then in the product 2. Then, considering a flow rate Q of frozen product, the specific power Ps dissipated in the product is $Ps=0.8*P/Q$ In the following table several examples are given.

| Q | P | 0.8P | Ps |
|---|---|---|---|
| 6/h | 11 kW | 8.8 | 1.4 kW/t |
| 12 t/h | 15 kW | 12 | 1 kW/t |
| 24/h | 30 kW | 24 | 1 kW/t |

The specific power is adapted to defrosting the product of the 10% as long as the product enters the shredding section at a temperature close to the fusion temperature.

To assist shredding the frozen product, in a co-axial position on the armature a rotating cutter $4c$ is mounted comprising a plurality of blades, of which only some are shown.

Figure 4C:
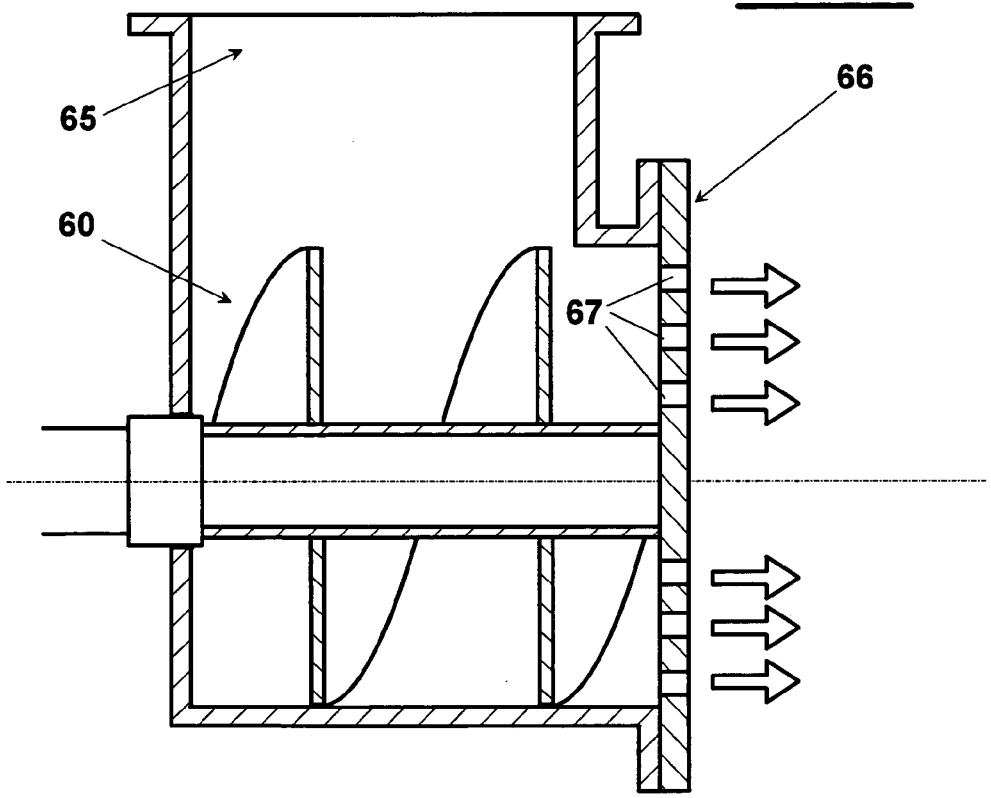

In an exemplary embodiment shown in FIG. 4C, the softening section provides a screw conveyor 60 adapted to push the product fed through an inlet 65 against an apertured matrix 66 equipped with a plurality of apertures 67. In particular, in this case the product passes through the apertures 67 of the apertured matrix 66 and is softened by the extrusion.

A further exemplary embodiment shown in FIG. 4D provides a roller 8 rotating about an axis 108 and peripherally having knives 40 adapted to grind the product fed through the inlet 65. In this case, then, the product is softened by grinding.

The chopped product exits from the softening section through the axial outlets 10, as in the case of FIGS. 4A, 4C, and 4D, or through radial outlet 11, as in the case of FIG. 4B. It is still largely frozen, in the form substantially of "water-ice", with a liquid phase and a solid phase of size between 0.3 and 6 mm with possible solid larger residues, such as peelings, seeds, etc.

Figure 2:
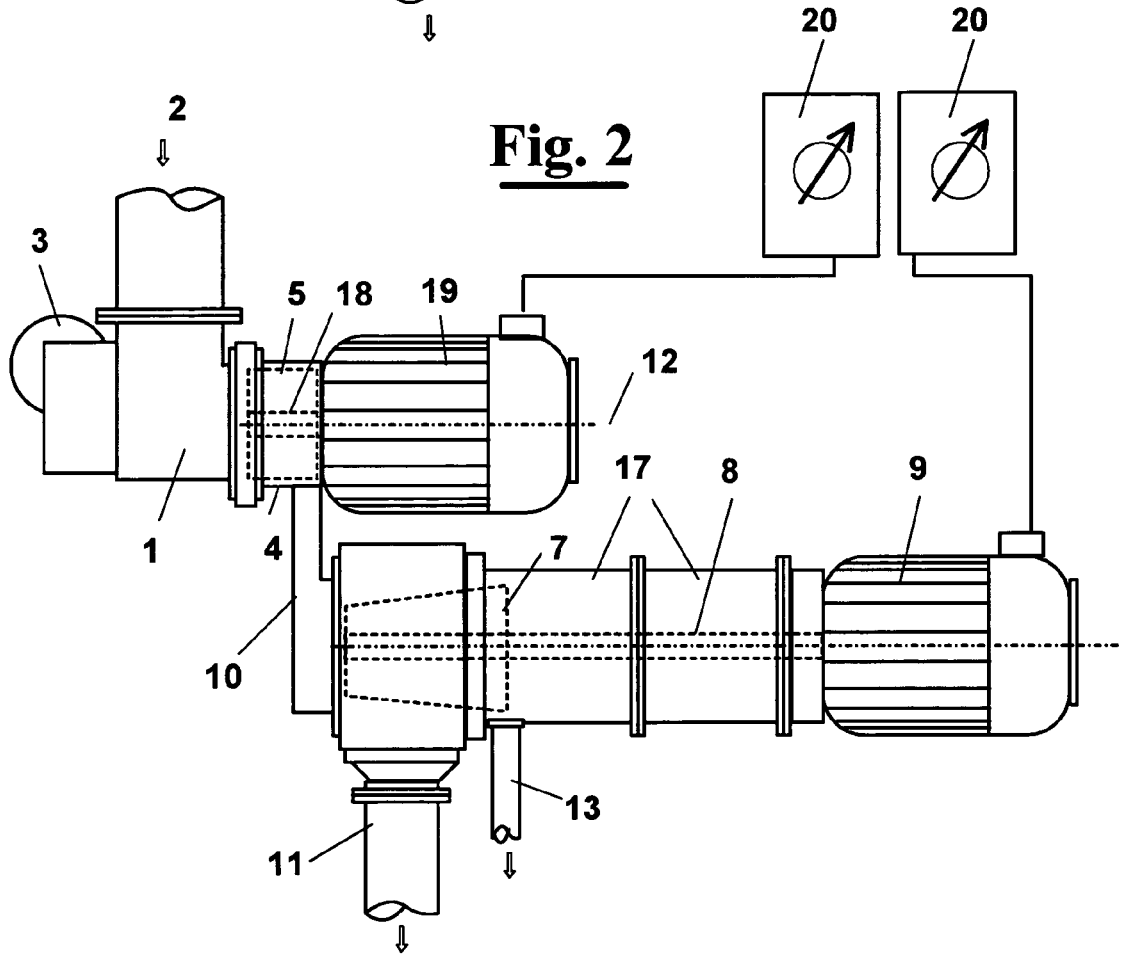
FIG. 2 shows a longitudinal cross section of a rotating machine for extracting puree or juice in a second configuration.

This chopped "water-ice", then, passes through a second section 6, where, by sieve 7 that is wheeled by motor 9 and shaft 8 in both the embodiments of FIG. 1 or 2, the separation is carried out of the part of pulp that can be used (puree or juice), which are conveyed through an outlet duct 12, by the waste solid parts (peelings, seeds, hard fibres), which are directed towards an outlet 13 of a unloading section 17.

In particular, according to the invention, in case of starting frozen product, the puree or juice thus obtained comprises a liquid phase where still frozen solid particles are dispersed that are caused to pass through the sieve of the extractor, which has second armature 7 that engages with a stator comprising a sieve of identical size, like that described in IT1199392. several sieving steps can be provided of sieving in succession, with mesh size decreasing from 6 mm up to a minimum of 0.3 mm.

The course of the temperature of the product is shown in FIG. 5, according to which the product remains partially frozen at least up to the end of the extraction, being T* the fusion temperature of the product, which can be 0° C. or even less, according to the product.

According to the present invention, a fluid material is obtained that has the consistency of a puree even if it contains still small frozen parts that are sized like the holes of the sieve. This aspect is relevant because in this way a puree is obtained that is only partially defrosted and then the supply of energy is less than that obtained for a full defrosting. It is for example possible to freeze again this puree without the need of all the thermal power demand for a total defrosting and for freezing it again with a double energy saving, or it is possible to proceed to a total defrosting and to an enzymatic inactivation in a single step with a plant similar to that described in EP1585818.

Figure 6:
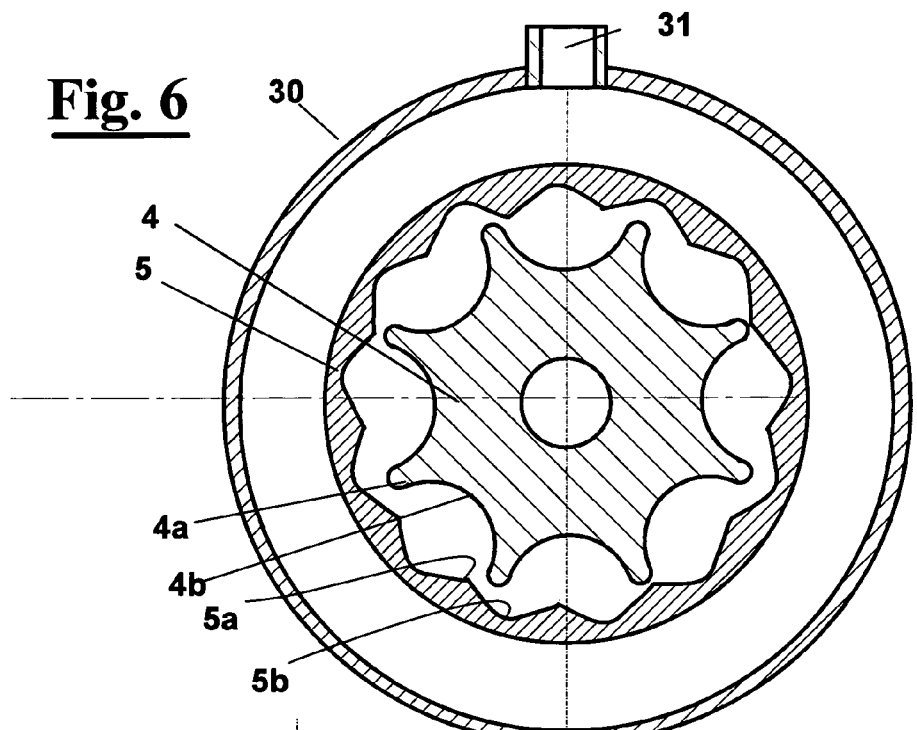
FIGS. 6 and 7 show respectively a cross sectional view and longitudinal view of the softening section of the rotating machine of FIG. 2 in a second exemplary embodiment.
Figure 7:
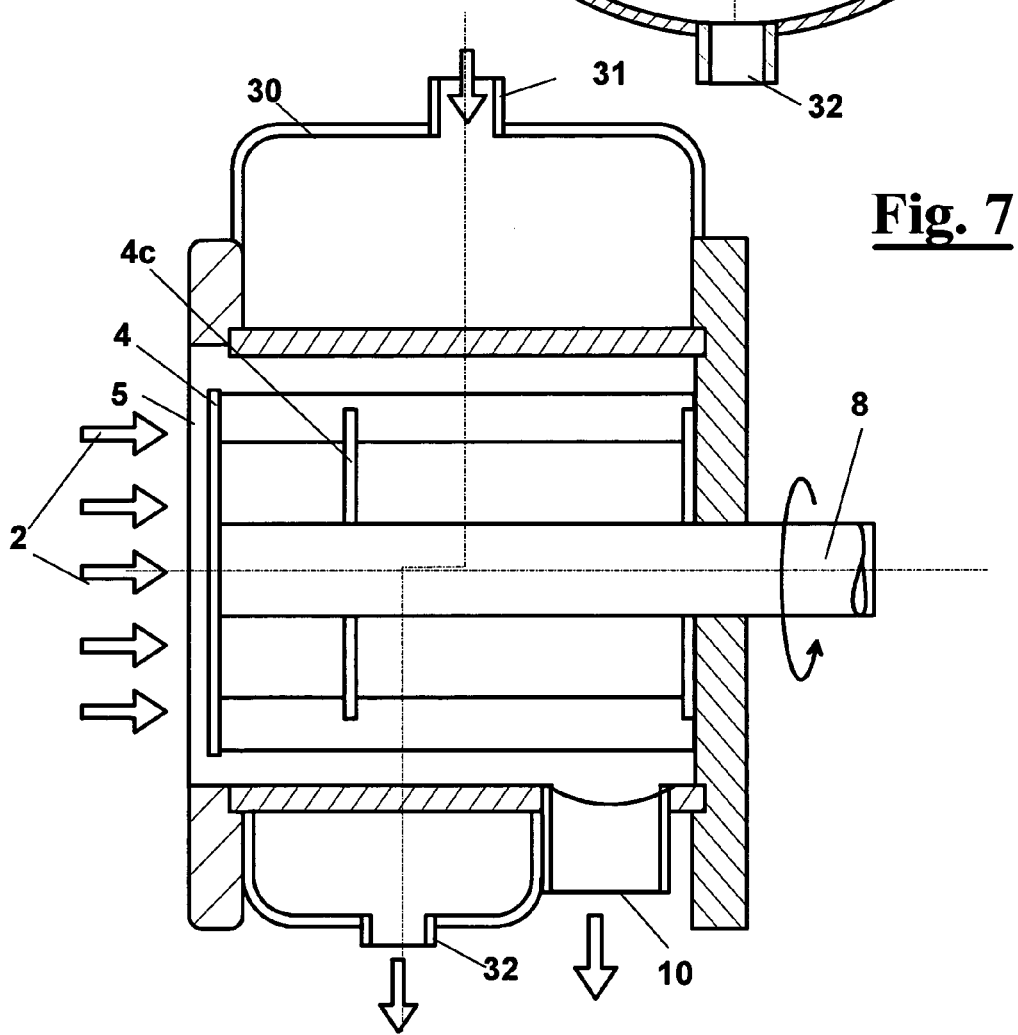

In FIGS. 6 and 7 another exemplary embodiment of the invention is described for the case of FIG. 4B, being it clear that it is used like the case of FIG. 4A. In particular, on the external wall of stator 5 the application is provided of thermal power contemporaneously to the pressure pulses, in order to heat the inner surface of stator 5. In particular, the thermal power is supplied by heating the stator by a circulation of vapour in a jacket 30 without contact with the frozen product. The jacket 30 has inlet and outlet mouths 31 and 32 that are in communication with a vapour supply circuit not shown.

In an exemplary embodiment, not shown, the stator can have holes for the vapour so that the vapour circulates in the stator and at the same time is injected between the two facing surfaces of armature 4 and of stator 5.

The vegetable frozen product is then subject to a quick heating step consisting of a contact of the product with the inner surface of stator 5 in addition to the mechanical friction on the product and to the pulses of pressure. This heating assists a partial defrosting also in case of a frozen product 2 that is fed at a temperature much less than 0°, for example −20° C. The thermal power supplied, for example, can be adjusted according to the rate of defrosting that has to be achieved when entering in the extractor, responsive to the type of product to treat. For example, to obtain a partial defrosting the amount of thermal power to provide, in addition to that supplied for mechanical dissipation, can be set between 10 and 100 kW/t, or also up to 200 kW/t, responsive to the starting temperature of the frozen product and of the type of product.

The same inner surface of stator 5, with its protrusions and recesses 5a and 5b, in addition to heating the product, also determines a relevant decrease of the size of the particles of the chopped product owing to the intense fluctuation of pressure and to the friction.

In an exemplary embodiment, not shown, also armature 4 can have inside channels for the vapour so that the vapour circulates in the armature and its inner surface is heated.

A treatment of this type allows very quickly, up to several seconds as time passing the device, to obtain a frozen product which is fluid and feeds the extraction machine so that it can load the product obtained from the extraction without problems of internal fluidity, obtaining a good overall efficiency considered as ratio between extracted product/loaded product.

Furthermore, the supplied heat is used only for causing the water content of product to melt partially without generating enzymatic transformations.

Figure 8:
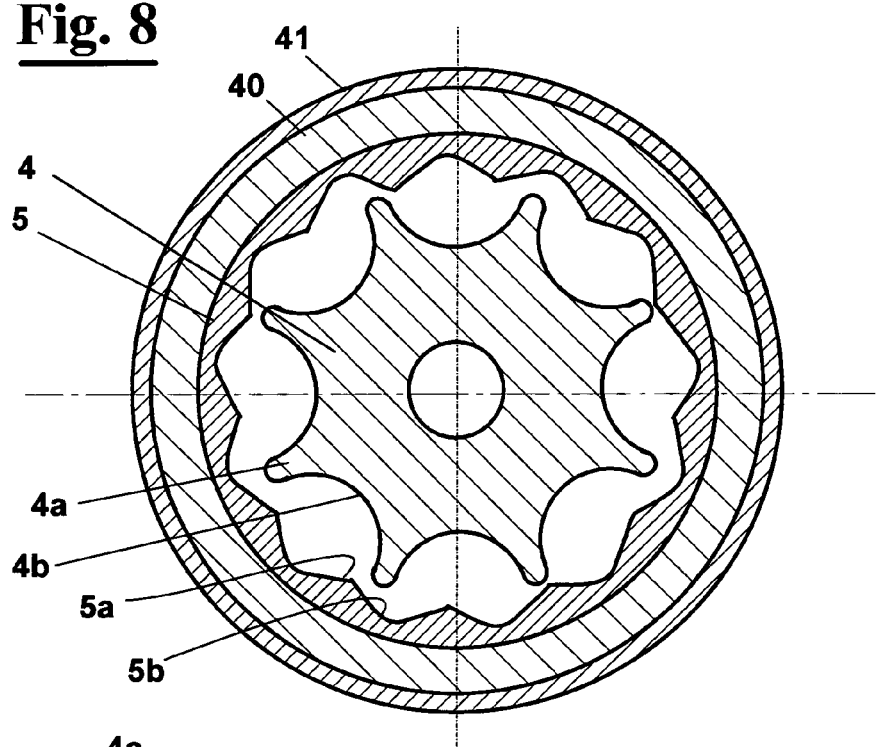
FIGS. 8 and 9 show respectively a cross sectional view and longitudinal view of the softening section of the rotating machine of FIG. 2 in a third exemplary embodiment.
Figure 9:
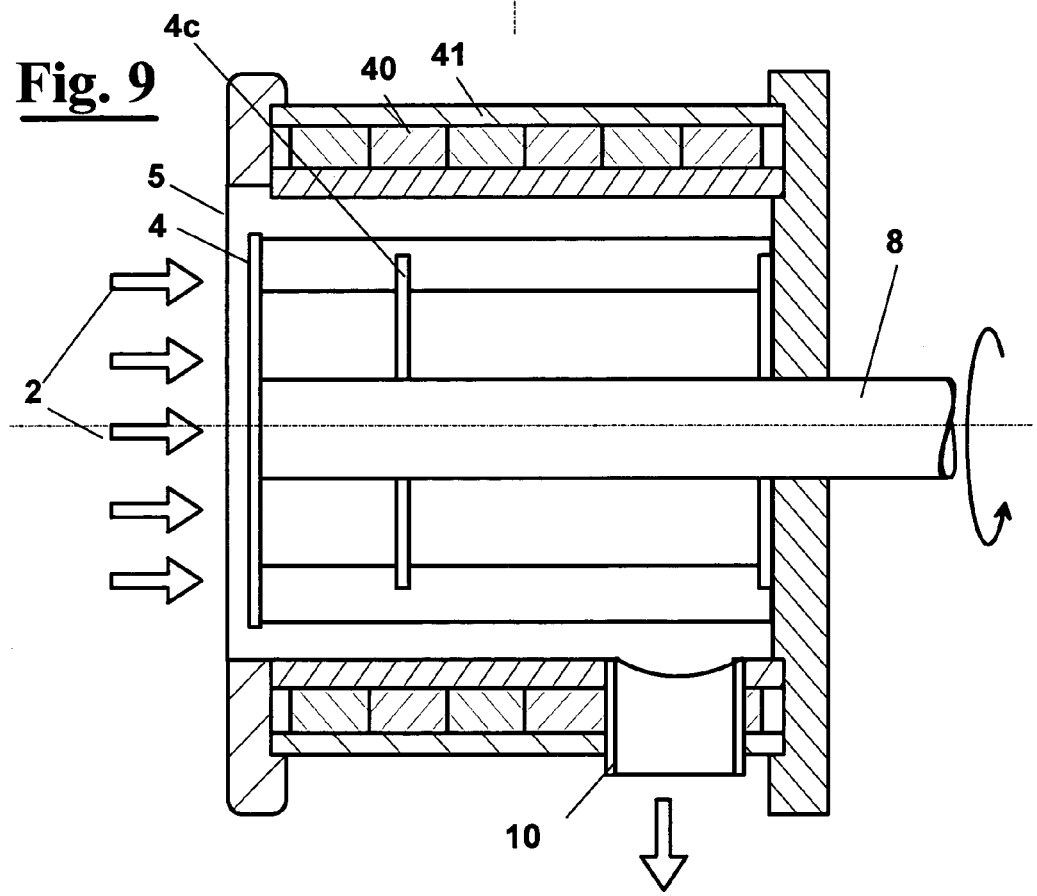

In FIGS. 8 and 9, a further exemplary embodiment of the invention is described for the case of FIG. 4B, being it clear that it is used like the case of FIG. 4A. In a way similar to the case of FIGS. 6 and 7, on the external wall of stator 5 the application is provided of thermal power by means of electric resistance 30 that is arranged out of the stator, and insulated by a sheath 31 for not wasting heat outside.

Also in this case, then, the vegetable frozen product is subject to a quick heating step consisting of the contact with the inner surface of stator 5 in addition to the mechanical friction and to the pressure fluctuation on the product. The same inner surface of stator 5, with its protrusions and recesses 5a and 5b, serves, in addition to heating also for a relevant of decrease the size of the particles of the chopped product owing to an intense fluctuation of pressure and to friction.

This heating step, in addition to assist a partial defrosting also in case of frozen product 2 that is fed at a temperature much less than 0°, for example −20° C., allows also adjusting instantly the thermal power responsive to increases or decreases of flow rate or responsive to fluctuation of the temperature of the stator, allowing a feedback control of the supplied power/power demand by the system.

In an exemplary embodiment, not shown, armature 4 can have an inner electric resistance by which its inner surface is heated.

In a way not shown, as described for example in EP1353570, a step can be provided of de-aeration to the temperature of the product in outlet of the step of extraction, or, as described in EP1684600, the extraction can be carried out under vacuum.

After the extraction, it is possible to carry out a following heating step to obtain a total defrosting, which can follow a refining step with sieves that are smaller than those used at the extraction of the frozen product.

The examples now given for a frozen product can be equally applied to a fresh product, which then has not been subject to freezing, but that in any case is kept cold, for example about 2-5° C., before being transformed in puree. For example, in the cases, according to the type of vegetable, where an cold extraction is not possible, with to the machine of the invention a heating is obtained at a higher temperature, in particular at room temperature, so that heating is achieved immediately before the extraction, for delaying at most the enzymatic phenomena.

The foregoing description of a specific embodiment will so fully reveal the invention according to the conceptual point of view, so that others, by applying current knowledge, will be able to modify and/or adapt for various applications such an embodiment without further research and without, parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A process for extracting puree or juice from food pulps of food frozen products, said method comprising the steps of:
   feeding said food frozen products to a softening section;
   applying a mechanical action to said food frozen products in said softening section to obtain a frozen product that is finely chopped to a size less than 6 mm, wherein the mechanical action provides at least 10% of its latent heat of fusion to the frozen products, and in such a way that the product is still largely frozen when it exits the softening section;
   feeding said finely chopped product, which is still largely frozen, to an extractor provided with a sieve;
   extracting said puree or juice in an extraction section by passing said finally chopped frozen product at least partially defrosted through the sieve;
   wherein the product remains partially frozen at least up to the end of the extraction section.

2. Process according to claim 1, wherein, said mechanical action is selected from the group consisting of:
   pressure pulses applied to said food frozen products;
   a cutting action made by means of cutting elements that cut said food frozen products; and
   an action of extrusion of said food frozen products pushed with force through a perforated matrix.

3. Process according to claim 1, wherein, said puree or juice comprises a liquid phase having frozen solid particles dispersed therein, and wherein the liquid phase and frozen particles pass through the sieve of the extractor.

4. Process according to claim 2, wherein said mechanical action is associated with an action of friction of said product in a stator by an armature that rotates in said stator, at a predetermined speed.

5. Process according to claim 4, wherein said pressure pulses and said action of friction cause a transformation of mechanical energy into thermal energy for an amount set between 0.5 Kw/ton up to 1.5 Kw/ton of product.

6. Process according to claim 2, wherein in said softening section, thermal power is applied contemporaneously to said pressure pulses.

7. Process according to claim 6, wherein said pressure pulses are applied by moving said frozen product between an armature and a stator with inner surfaces that are facing each other and have protrusions and recesses, said thermal power being supplied by heating at least one among said inner facing surfaces.

8. Process according to claim 6, wherein said thermal power is set between 1 and 200 Kw/ton of product.

9. Process according to claim 6, wherein said mechanical action is associated with an action of friction of said product in a stator by an armature that rotates in said stator at a predetermined speed and wherein the thermal power is supplied by heating said stator by means of circulation of vapour out of said stator.

10. Process according to claim 4, wherein vapour is injected in said stator.

11. Process according to claim 6, wherein said mechanical action is associated with an action of friction of said product in a stator by an armature that rotates in said stator at a predetermined speed and wherein the thermal power is supplied by heating the surface of said stator to contact with the product by means of electric resistance in said stator.

* * * * *